(12) United States Patent
Russalian (10) Patent No.: US 10,295,076 B2
(45) Date of Patent: May 21, 2019

(54) MODULAR ELECTRO-MECHANICAL ROTARY VALVE WITH ACTIVATED SEAL INTERFACE

(71) Applicant: Schaeffler Technologies AG & Co. KG, Herzogenaurach (DE)

(72) Inventor: Vigel Russalian, Macomb, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 13 days.

(21) Appl. No.: 15/341,642

(22) Filed: Nov. 2, 2016

(65) Prior Publication Data

US 2018/0119839 A1    May 3, 2018

(51) Int. Cl.
| | | |
|---|---|---|
| *F16K 11/085* | (2006.01) | |
| *F16K 27/06* | (2006.01) | |
| *F01P 7/02* | (2006.01) | |
| *F01P 7/14* | (2006.01) | |
| *F16K 11/087* | (2006.01) | |
| *F16K 27/00* | (2006.01) | |
| *F16K 31/04* | (2006.01) | |
| *F16K 31/524* | (2006.01) | |

(Continued)

(52) U.S. Cl.
CPC ............. *F16K 27/067* (2013.01); *F01P 7/02* (2013.01); *F01P 7/14* (2013.01); *F01P 7/16* (2013.01); *F16K 11/0876* (2013.01); *F16K 27/003* (2013.01); *F16K 31/043* (2013.01); *F16K 31/52466* (2013.01); *F16K 31/535* (2013.01); *F01P 2007/143* (2013.01); *F01P 2007/146* (2013.01); *F16K 11/0856* (2013.01); *F16K 11/0873* (2013.01)

(58) Field of Classification Search
CPC ............. F16K 11/0856; F16K 11/0873; F16K 31/52466; F01P 2007/143; F01P 2007/146; F01P 7/14
See application file for complete search history.

(56) References Cited

U.S. PATENT DOCUMENTS

| | | | | |
|---|---|---|---|---|
| 2,996,083 A | * | 8/1961 | Huska | F16K 11/085 137/625.11 |
| 4,989,641 A | * | 2/1991 | Jones | F16K 11/085 137/625.11 |

(Continued)

FOREIGN PATENT DOCUMENTS

WO    2015013273 A1    1/2015

*Primary Examiner* — Matthew W Jellett
*Assistant Examiner* — Christopher D Ballman
(74) *Attorney, Agent, or Firm* — Matthew V. Evans (57) ABSTRACT

A modular electro-mechanical rotary valve (EMRV) designed to be installed and removed as a unit is provided. The modular EMRV includes a valve enclosure, at least one rotary valve body with at least one fluid pathway, and an actuator assembly. The valve enclosure, removably disposed within a mating cavity, includes at least one inlet, at least one outlet, and a hollow center. At least one of the at least one inlet or the at least one outlet is configured with at least one exterior seal interface to sealingly engage with at least one interior seal interface of the mating cavity. The actuator assembly, engaged with an actuator interface of the at least one rotary valve body, rotationally actuates the at least one rotary valve body disposed within the hollow center of the valve enclosure.

19 Claims, 10 Drawing Sheets

(51) Int. Cl.
  *F16K 31/53* (2006.01)
  *F01P 7/16* (2006.01)

(56) References Cited

U.S. PATENT DOCUMENTS

| | | | | |
|---|---|---|---|---|
| 5,095,855 | A | * | 3/1992 | Fukuda ............ F01P 3/20 |
| | | | | 123/41.1 |
| 5,730,089 | A | * | 3/1998 | Morikawa ........ B60H 1/00885 |
| | | | | 123/41.14 |
| 6,273,134 | B1 | * | 8/2001 | Edwards ............ A61L 2/26 |
| | | | | 137/625.46 |
| 6,314,920 | B1 | * | 11/2001 | Suzuki ............ F01P 7/048 |
| | | | | 123/41.1 |
| 6,539,899 | B1 | | 4/2003 | Piccirilli et al. |
| 7,334,543 | B2 | * | 2/2008 | Pawellek ............ F01P 5/10 |
| | | | | 123/41.1 |
| 7,343,933 | B2 | * | 3/2008 | McBeth ............ F16K 11/074 |
| | | | | 137/625.11 |
| 8,671,982 | B2 | | 3/2014 | Stoermer |
| 8,978,596 | B2 | * | 3/2015 | Glassford ............ F01P 3/20 |
| | | | | 123/41.05 |
| 9,500,299 | B2 | * | 11/2016 | Morein ............ F16K 11/0876 |
| 2006/0102865 | A1 | | 5/2006 | Pervaiz |
| 2010/0126594 | A1 | | 5/2010 | Sheppard |
| 2010/0282190 | A1 | | 11/2010 | Stoermer |
| 2014/0083510 | A1 | | 3/2014 | Blieske et al. |
| 2014/0366771 | A1 | * | 12/2014 | Bianchi ............ B21C 37/08 |
| | | | | 105/360 |
| 2015/0226343 | A1 | * | 8/2015 | Jenks ............ F17D 3/00 |
| | | | | 137/1 |
| 2015/0285143 | A1 | * | 10/2015 | Pollock ............ F02C 9/18 |
| | | | | 251/315.01 |
| 2016/0146092 | A1 | * | 5/2016 | Lee ............ F01P 7/16 |
| | | | | 123/41.1 |
| 2016/0178074 | A1 | * | 6/2016 | Aoki ............ F16K 11/0873 |
| | | | | 137/625.22 |
| 2016/0363236 | A1 | * | 12/2016 | Smith ............ F16K 37/0041 |
| 2017/0321815 | A1 | * | 11/2017 | Vuichard ............ F16K 11/0873 |

\* cited by examiner

MODULAR ELECTRO-MECHANICAL ROTARY VALVE WITH ACTIVATED SEAL INTERFACE

TECHNICAL FIELD

Example aspects described herein relate to electro-mechanical rotary valves for use within fluid cooling systems of vehicular powertrains.

BACKGROUND

As fuel economy becomes paramount in the transportation industry, efforts have increased to achieve higher internal combustion (IC) engine efficiencies and to seek alternative powertrains. Coolant valves are well known and can be arranged to provide coolant flow control for temperature management of various powertrain components including internal combustion engines, transmissions and various components of hybrid electric and fuel cell vehicles.

A portion of coolant valves are electro-mechanical in design, incorporating an actuator assembly that interfaces with a mechanical rotary valve body to provide a controlled flow of coolant to a selected powertrain component or system. An electric motor, controlled by the engine control unit, is often employed within the actuator assembly of the electro-mechanical rotary valve (EMRV) to achieve any desired angular position of the rotary valve body. A transmission or gear train can be utilized between the electric motor and rotary valve body. An injection molded plastic outer housing is typically used for an EMRV that is often mounted directly on either a cylinder head or cylinder block of the IC engine. The use of plastic provides a light-weight solution to fulfill complex outer housing design specifications that are required for mounting and sealing the EMRV to the engine, providing connections for hoses, and guiding and sealing the internal rotary valve. The outer housing must be able to withstand the rigors of a vibrating IC engine, which include large temperature fluctuations and exposure to dust, water, and salt. Additionally, all of the fasteners for either mounting or sealing of the hoses must be accessible within a crowded IC engine compartment.

Due to these design requirements and rigorous environment, the outer housing is often one of the higher priced components of the EMRV and also contributes to many failure modes that could occur. Amongst all of the components of the EMRV, the outer housing typically requires the most time and effort to achieve a production-worthy design. A new design for an EMRV is needed that addresses these shortcomings while maintaining critical functions for current and future applications.

SUMMARY OF THE INVENTION

A modular electro-mechanical rotary valve (EMRV) is provided that eliminates a traditional outer housing and instead utilizes a mating cavity integrated within a powertrain component. "Modular" describes the scalability, flexibility, and simplicity of the modular EMRV that can easily be installed and removed as a unit within the mating cavity, which reduces packaging space and component cost while increasing robustness and serviceability.

The modular EMRV includes a valve enclosure, at least one rotary valve body with at least one fluid pathway, and an actuator assembly. The valve enclosure includes at least one inlet, at least one outlet, and a hollow center. At least one exterior seal interface is arranged on at least one of the at least one inlet or the at least one outlet to sealingly engage with at least one interior seal interface of the mating cavity. At least one seal may be present between the at least one exterior seal interface and the at least one interior seal interface. The at least one rotary valve body, disposed within the hollow center of the valve enclosure, includes at least one fluid pathway and an actuator interface. The actuator assembly can be located at a first end and the at least one outlet can be located at a second end of the valve enclosure. The at least one inlet can be radially arranged on the valve enclosure.

In one example embodiment of a modular EMRV, either or both of the at least one inlet and the at least one outlet can have a seal interface housing, configured with the at least one exterior seal interface, that moves longitudinally within a transverse through-bore arranged on the valve enclosure. Displacement of the seal interface housing within the transverse through-bore is accomplished by actuation of at least one cam follower arranged on the seal interface housing. The at least one cam follower is actuated by a cam groove arranged on at least one leg of a cam leg portion that extends from the actuator assembly. The at least one cam leg can be received and guided by at least one cam leg reception channel that extends longitudinally from a first end of the valve enclosure. The cam groove can include a retention portion that, when engaged with the cam follower, achieves a first transport position of the seal interface housing, defined by a first radial distance. The cam groove can also include a ramp portion that, when engaged with the cam follower, achieves a second installed position of the seal interface housing, defined by a second radial distance that is greater than the first radial distance.

The actuator assembly, engaged with the actuator interface of the at least one rotary valve body, includes an actuator that rotationally actuates the at least one rotary valve body to achieve any desired angular or rotational position. The actuator assembly may also include a gear train arranged between the actuator and rotary valve body, and a drive shaft arranged between the gear train and rotary valve body, with a first end of the drive shaft engaged with the gear train and a second end engaged with the rotary valve body. Continuously variable angular positions of the at least one rotary valve body are possible to manage the fluid flows and subsequent temperatures of a fluid-cooled system. For a modular EMRV with two inlets and a single rotary valve body having a single lobe configured with a first fluid pathway and a second fluid pathway, potential rotational positions could include: a first rotational position of the rotary valve body that allows fluid flow from the first and second inlets to the outlet; a second rotational position of the rotary valve body that prevents fluid flow from the first and second inlets to the outlet; and, a first intermediate position that allows fluid flow from one of the first or second inlet to the outlet, and prevents fluid flow from the other of the first or second inlet to the outlet.

The mating cavity for the modular EMRV can be configured within but not limited to a powertrain component such as a cylinder head or cylinder block of an internal combustion engine or a transmission housing of a vehicle drivetrain. The mating cavity can extend inwardly or protrude outwardly from an outer wall of the powertrain components or any receiving structure. The mating cavity serves as a fluid terminal for intersecting fluid flow paths that interface with the valve enclosure of the modular EMRV; the flow of fluid within each of these fluid flow paths is managed by the angular position of the at least one rotary valve body disposed within the valve enclosure. The mating cavity can be cylindrical in shape.

BRIEF DESCRIPTION OF DRAWINGS

The above mentioned and other features and advantages of the embodiments described herein, and the manner of attaining them, will become apparent and better understood by reference to the following descriptions of multiple example embodiments in conjunction with the accompanying drawings. A brief description of the drawings now follows.

DETAILED DESCRIPTION OF THE EMBODIMENTS

Identically labeled elements appearing in different figures refer to the same elements but may not be referenced in the description for all figures. The exemplification set out herein illustrates at least one embodiment, in at least one form, and such exemplification is not to be construed as limiting the scope of the claims in any manner. Certain terminology is used in the following description for convenience only and is not limiting. The words "inner," "outer," "inwardly," and "outwardly" refer to directions towards and away from the parts referenced in the drawings. Axially refers to directions along a diametric central axis. Radially refers to directions that are perpendicular to the central axis. The words "left" and "right" designate directions in the drawings to which reference is made. The terminology includes the words specifically noted above, derivatives thereof, and words of similar import.

Figure 14:
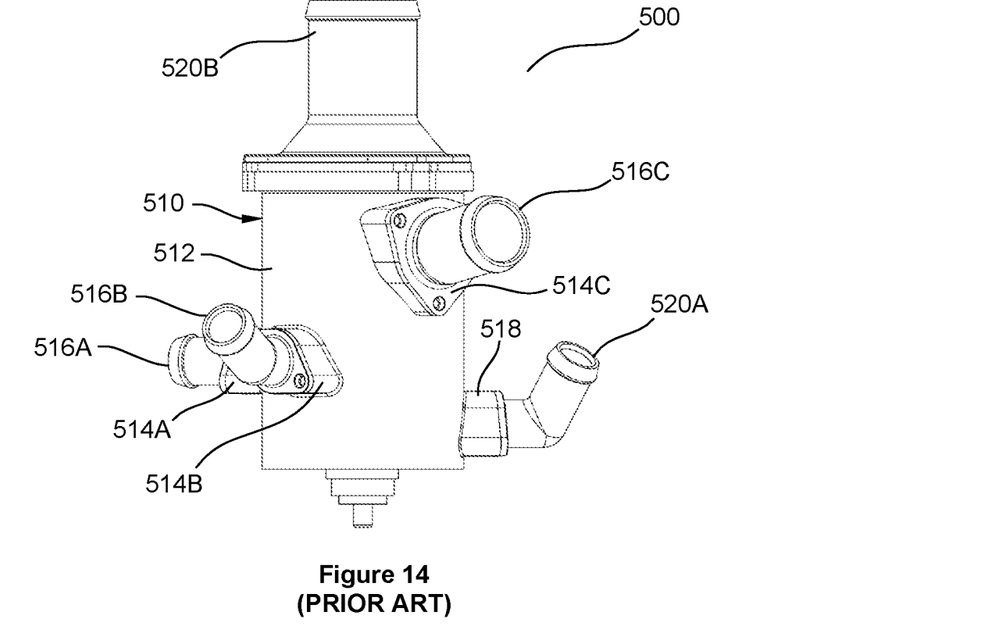
FIG. 14 is side view of a first prior art EMRV.

Referring to FIG. 14, a portion of a first prior art electro-mechanical rotary valve (EMRV) 500 is shown that includes an outer housing assembly 510 having a first inlet flange 514A, a second inlet flange 514B, a third inlet flange 514C, and an outlet flange 518, all radially arranged on a cylindrical outer housing 512. Separate first, second, and third inlet pipe components 516A-516C and an outlet pipe component 520A are attached to their respective flanges 514A-514C, 518. An additional outlet pipe component 520B is attached to an end of the outer housing 510. Hoses (not shown) extend from each of the inlet and outlet pipe components to various cooling system destinations to complete an engine cooling circuit.

Figure 15:
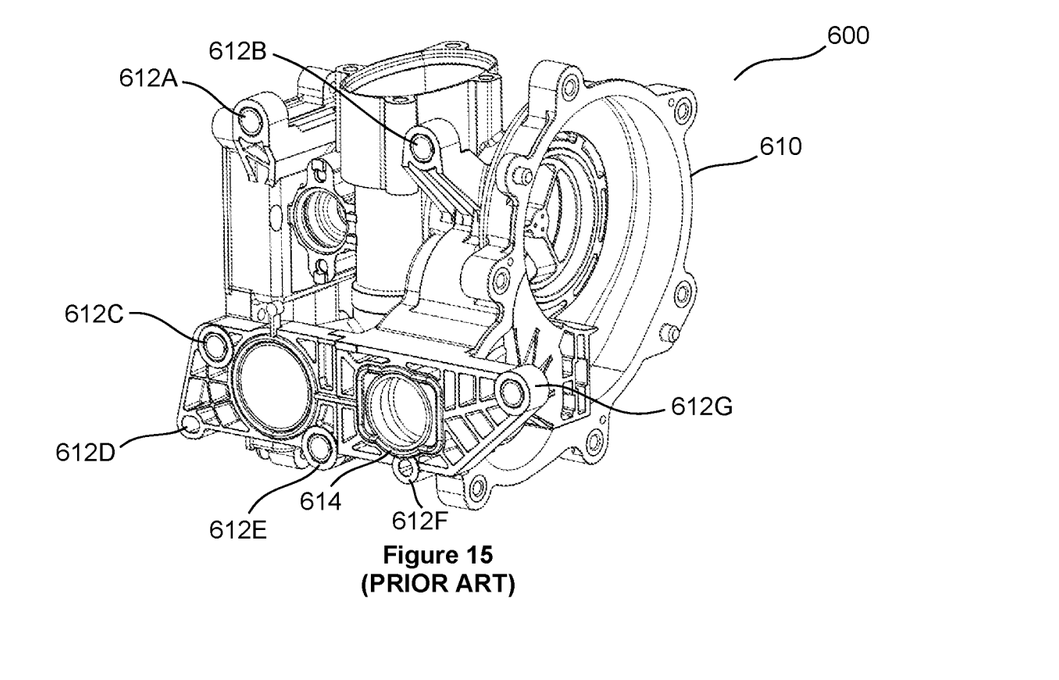
FIG. 15 is an isometric view of a second prior art EMRV.

Now referring to FIG. 15, a portion of a second prior art EMRV 600 is shown with an outer housing 610 configured with mounting features 612A-612G that attach the EMRV 600 to a mounting base of a powertrain component (for example, an IC engine, transmission or differential) or any other receiving structure. The outer housing 610 is also configured with an external sealing interface 614 to ensure that leakage does not occur between the EMRV 600 and the component or mounting surface upon which it is mounted. The outer housing 610 is typically injection-molded out of an expensive plastic material that can withstand extreme temperature fluctuations, and exposure to ethylene glycol or engine coolant in a vibrating and corrosive environment. The complexity of the outer housing 610 is significant, and therefore the design of the injection mold tooling is complex and requires significant development time and cost to incorporate many diverse exterior features while also providing interior features that require tight tolerances. Additionally, the packaging space required for the thermal management valve assembly 600 and its corresponding hoses is significant. A new design for an EMRV is needed that reduces the complexity and cost of the outer housing while lowering the packaging space.

FIGS. 1 through 5 and 11A through 13B show an example embodiment of a modular EMRV 10 that provides a simplified design that eliminates the use of a traditional outer housing. The modular EMRV 10 includes a valve enclosure 12, a rotary valve body 14, and an actuator assembly 16. The valve enclosure 12 includes a first inlet 20A, a second inlet 20B, a first transverse through-bore 27A, a second transverse through-bore 27B, an outlet 22, a central axis 18, and a hollow center 26. The first and second inlets 20A, 20B are radially arranged and the outlet 22 is located at a second end of the valve enclosure 12, however various positions of these elements on the valve enclosure 12 are possible. One skilled in the art of EMRVs would understand that it would be possible to switch the location of the outlet 22 with either one of the inlets 20A, 20B such that the outlet is radially arranged on the valve enclosure 12 and either the first or second inlet 20A, 20B is arranged on the second end 25 of the valve enclosure 12. Various shapes of the valve enclosure 12 are also possible to accommodate different applications having a wide array of packaging constraints.

The first inlet 20A includes a first inlet seal housing 46A disposed within the first transverse through-bore 27A, and the second inlet 20B includes a second inlet seal housing 46B disposed within the second transverse through-bore 27B. The shape of the first and second transverse through-bores 27A, 27B can be of any suitable form to support the first and second inlets 20A, 20B. The first inlet seal housing 46A is configured with a first exterior seal interface 28A, a first cam follower 48A, and a second cam follower 48B. The second inlet seal housing 46B is configured with a second exterior seal interface 28B, a third cam follower (not shown), and a fourth cam follower 48D. Optional first and second seals 29A, 29B can be arranged on the respective first and second inlet seal housings 46A, 46B, to engage first and second exterior seal interfaces 28A, 28B. Sealing interface designs other than what is shown are also possible that serve the purpose of sealing each of the first and second inlets 20A, 20B.

Figure 1:
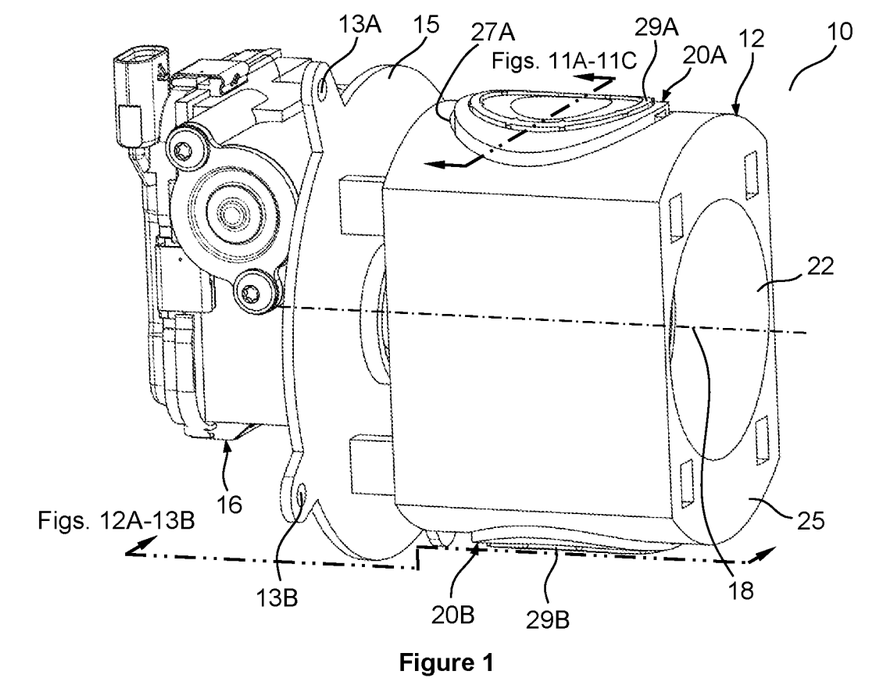
FIG. 1 is a perspective view of an example embodiment of a modular electro-mechanical rotary valve (EMRV).
Figure 2:
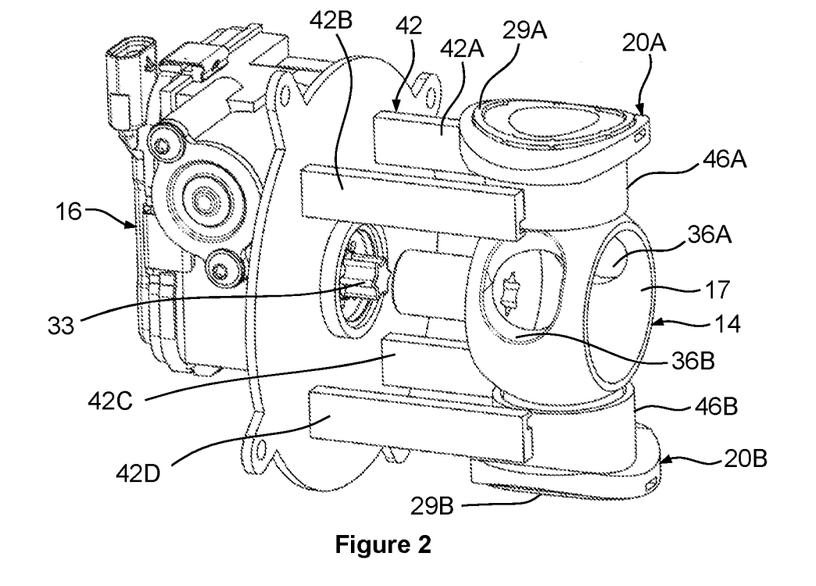
FIG. 2 is a perspective view of the modular EMRV of FIG. 1 without a valve enclosure.
Figure 3:
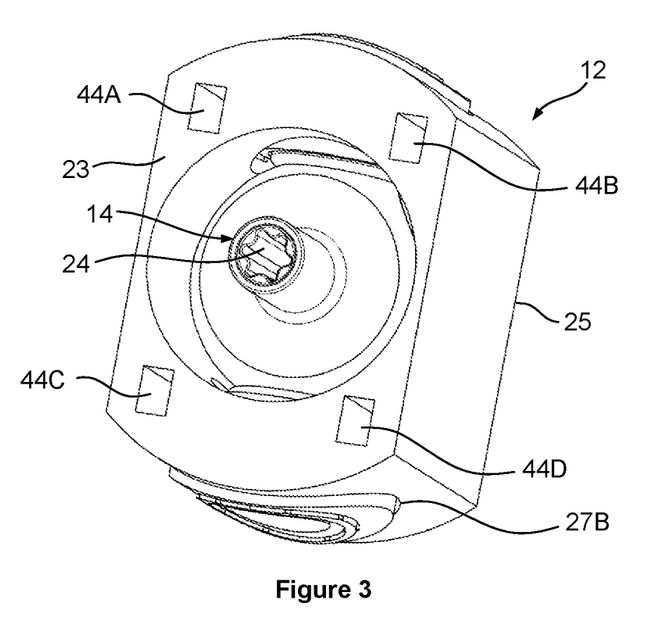
FIG. 3 is a perspective view of the valve enclosure of the modular EMRV of FIG. 1.
Figure 4:
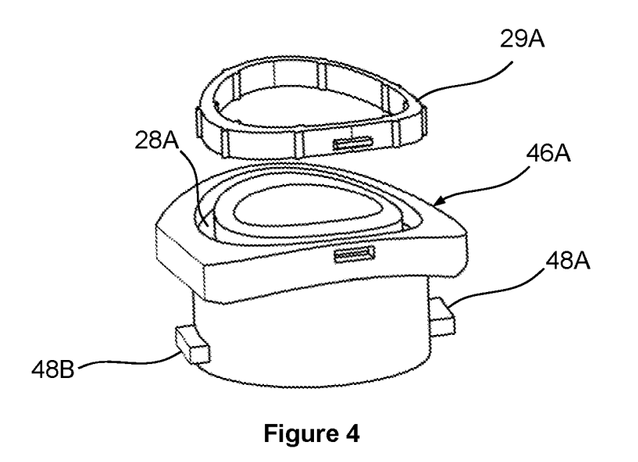
FIG. 4 is an exploded view of a seal interface housing for the modular EMRV of FIG. 1.
Figure 5:
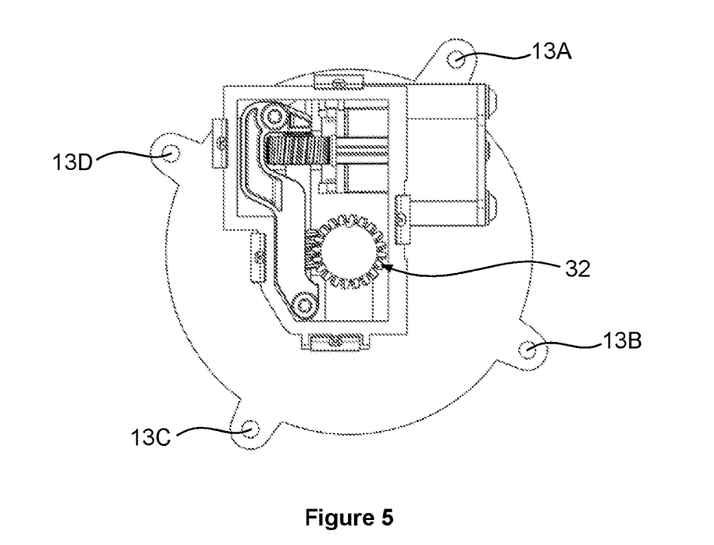
FIG. 5 is an end view of an actuator assembly (with cover removed) for the modular EMRV of FIG. 1.

The rotary valve body 14, actuated by the actuator assembly 16, is disposed within the hollow center 26 of the valve enclosure 12. The rotary valve body 14 includes an actuator interface 24 and a lobe 17 configured with a first fluid pathway 36A and a second fluid pathway 36B. The actuator assembly 16, arranged at a first end 23 of the valve enclosure 12, includes an actuator in the form of an electric motor 34; other forms of actuators can also be utilized. Rotary motion of the electric motor 34 is transferred to the rotary valve body 14 by a gear train 32 and a drive shaft 30 engaged with the rotary valve body 14. A first end 31 of the drive shaft 30 engages the gear train 32, while a second end 33 of the drive shaft 30 engages the actuator interface 24 of the rotary valve body 14. Those skilled in the art of EMRVs are aware that other forms of actuator assemblies are possible such as those that eliminate use of the gear train 32 and/or the drive shaft 30.

The arrangement of the first and second exterior seal interfaces 28A, 28B on the respective first and second inlets 20A, 20B provides for a smaller packaging space for the modular EMRV 10. The first and second inlets 20A, 20B do not require axial spacing along the length of the valve enclosure 12, but only angular spacing at a given axial location; thus, the overall length of the valve enclosure 12 can be reduced. This inlet arrangement is further facilitated by the application of first and second fluid pathways 36A, 36B arranged within a single lobe 17 of the rotary valve body 14, as opposed to having two lobes, each configured with a single fluid pathway. Further variations of the modular EMRV 10 could include additional inlets, facilitated by a third fluid pathway applied to the lobe 17 of the rotary valve body 14 or multiple lobes arranged on the rotary valve body 14, each lobe configured with one or more fluid pathways.

Figure 7:
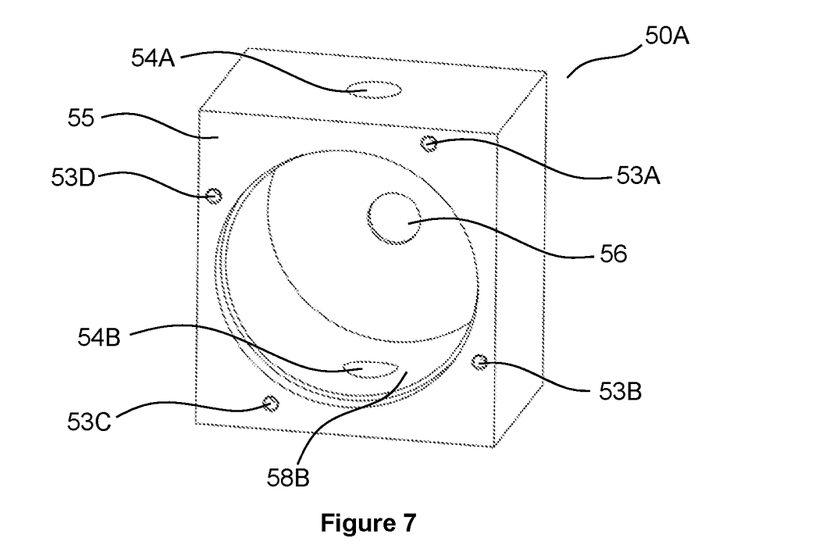
FIG. 7 is a perspective view of an example embodiment of a mating cavity.
Figure 8:
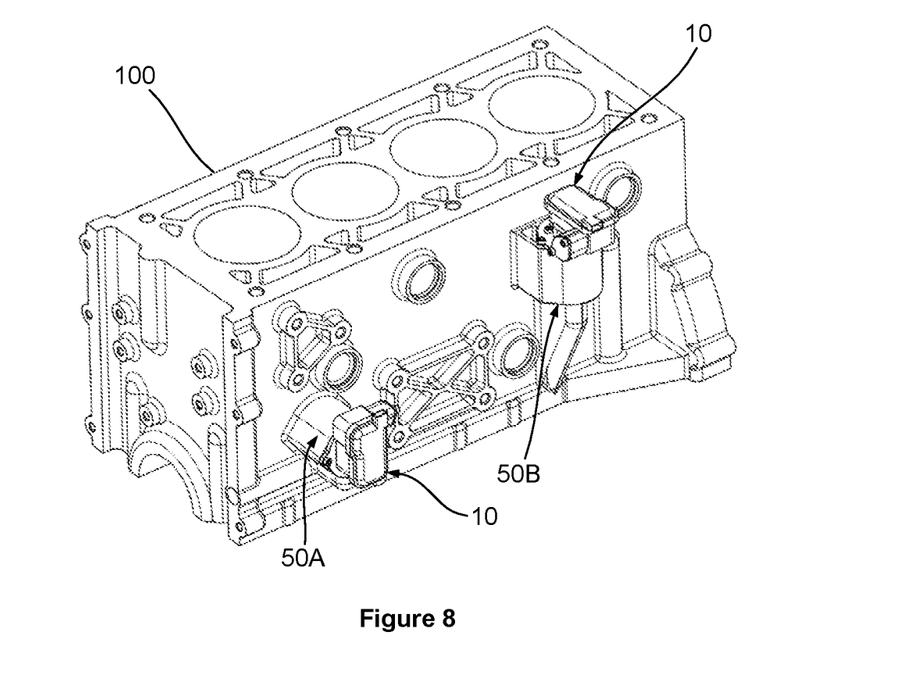
FIG. 8 is a perspective view of the modular EMRV of FIG. 1 applied to multiple locations of an engine block of an internal combustion engine.
Figure 9:
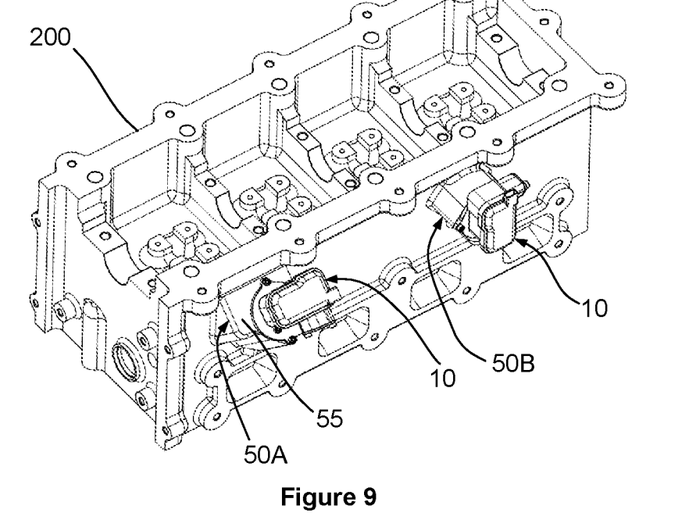
FIG. 9 is a perspective view of the modular EMRV of FIG. 1 applied to multiple locations of a cylinder head of an internal combustion engine.

FIGS. 7 through 10B show different structural applications of how a single or multiple modular EMRVs 10 can be applied to various applications. Two modular EMRVs 10 are shown in FIG. 8, each placed within a first and a second mating cavity 50A, 50B arranged on an engine block 100 of an internal combustion engine. FIGS. 9 and 10A show additional arrangements of modular EMRVs 10 within a cylinder head 200 of an internal combustion engine and a transmission housing 300 of a vehicle, respectively. The first mating cavity 50A, hereafter referred to as "the mating cavity 50A", serves as a fluid terminal for at least two intersecting fluid flow paths, with the modular EMRV 10 regulating the amount of fluid flow. The mating cavity 50A can be formed on or within the engine block 100, cylinder head 200, or transmission housing 300 (or any powertrain component) by current state-of-the-art casting and machining methods. The arrangements shown in FIGS. 8 through 10B exemplify the versatility of the modular EMRV 10, having a capability to be placed in multiple locations in various orientations according to packaging and functional specifications of an application. With the modular EMRV 10, optimum locations can be selected to manage localized cooling zones, as opposed to selecting a single location that could require extra effort and cost to ensure that all controlled coolant passages are routed to that location. Additionally, the modular EMRV 10 and mating cavity 50A arrangement eliminates the need for hoses for external routing of coolant passages, as all coolant passages are internally routed to the mating cavity 50A.

Figure 10A:
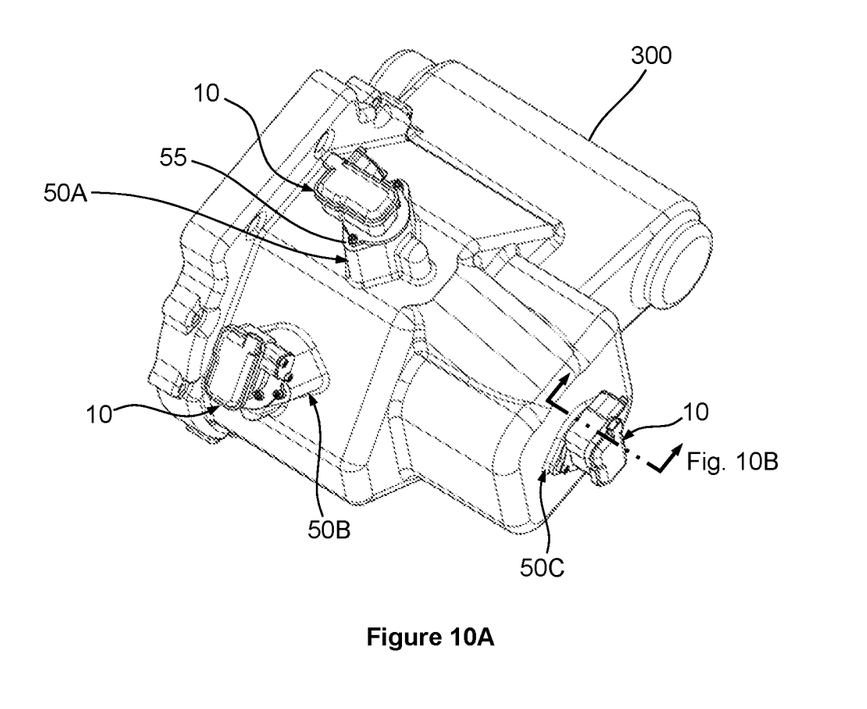
FIG. 10A is a perspective view of the modular EMRV of FIG. 1 applied to multiple locations of a transmission housing.
Figure 10B:
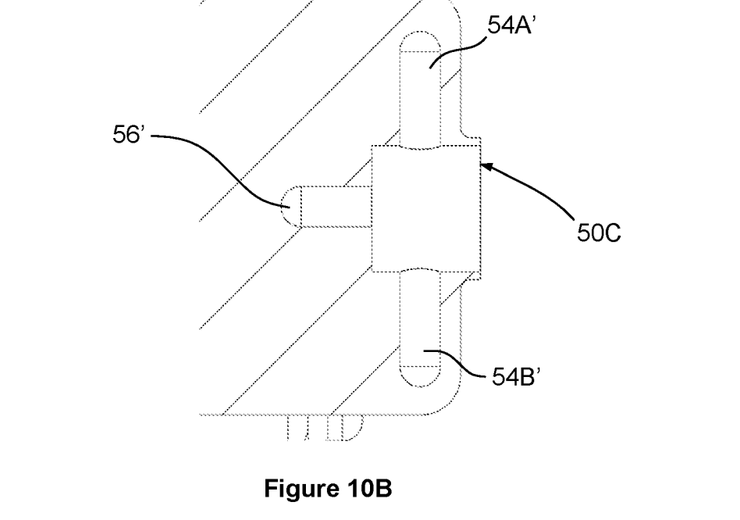
FIG. 10B is a cross-sectional view taken from FIG. 10A with the modular EMRV removed.

FIG. 10A shows a third mating cavity 50C that extends inside of the transmission housing 300, as opposed to earlier described designs in FIGS. 8 and 9 where the mating cavity protrudes outwardly from an outer wall of the engine block 100 and cylinder head 200, respectively. A cross-sectional view shown in FIG. 10B provides further details of the third mating cavity 50C that includes a first inlet flow passage 54A', a second inlet flow passage 54B', and an outlet flow passage 56'.

For proper installation of the modular EMRV 10 within the mating cavity 50A, sealing isolation of the first and second inlets 20A, 20B is required to prevent cross-talk or communication of the two inlet flow passages 54A, 54B. Sealing isolation can be accomplished by the first exterior seal interface 28A sealingly engaging a third interior seal interface 58A of the mating cavity 50A and the second exterior seal interface 28B sealingly engaging a fourth interior seal interface 58B of the mating cavity 50A. Optional first and second seals 29A, 29B can be arranged between the first and second exterior seal interfaces 28A, 28B and the respective third and fourth interior seal interfaces 58A, 58B.

Figure 12A:
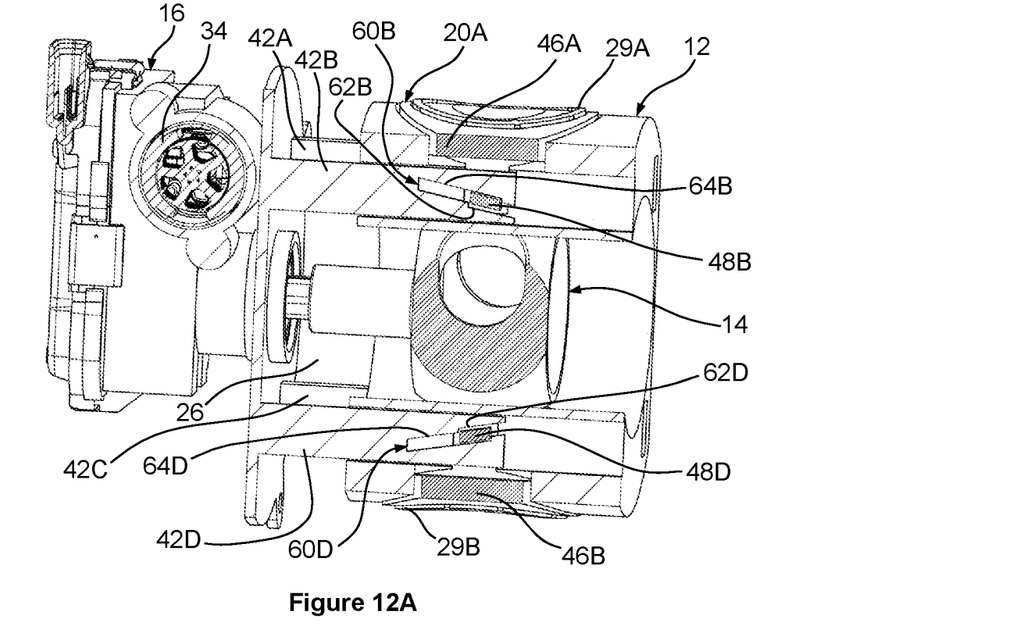
FIG. 12A is a perspective cross-sectional view taken from FIG. 1 of the modular EMRV in a first transport position.

For the example embodiment of the modular EMRV 10 shown in FIGS. 1 through 5, engagement of the first and second exterior seal interfaces 28A, 28B with the third and fourth interior seal interfaces 58A, 58B of the mating cavity 50A is enabled by a cam groove and cam follower system. The actuator assembly 16 includes a cam leg portion 42 having a first, second, third, and fourth longitudinally extending cam legs 42A-42D. The four cam legs 42A-42D are received by respective first, second, third, and fourth reception channels 44A-44D that extend longitudinally from a first end 23 of the valve enclosure 12. Referring now to FIG. 12A that shows a cross-sectional view that cuts through the second and fourth legs 42B, 42D, each of the four legs 42A-42D is configured with a first (not shown), second 60B, third (not shown), and fourth 60D cam groove, respectively. The first and second 60B cam grooves engage and guide the respective first and second cam followers 48A, 48B arranged on the first inlet seal interface housing 46A; the third and fourth 60D cam grooves engage and guide the respective third (not shown) and fourth 48D cam followers. Given the angled form of the cam grooves, as the four cam legs 42A-42D penetrate deeper within their respective reception channels 44A-44D, the first and second seal interface housings 46A, 46B are displaced radially outward from the central axis 18 of the valve enclosure 12.

Figure 12B:
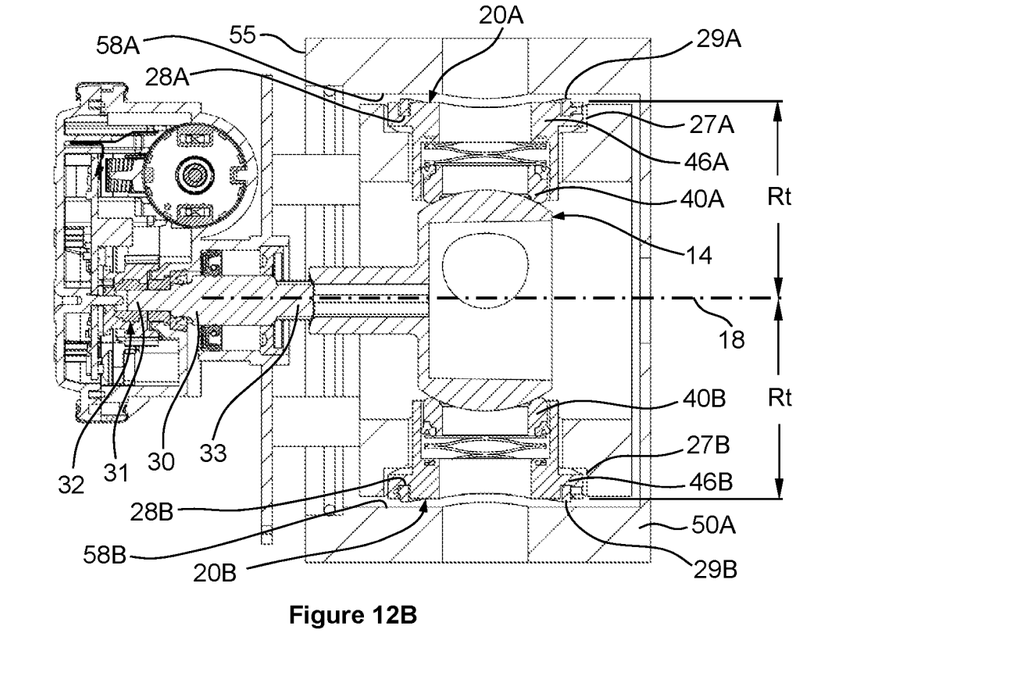
FIG. 12B is a cross-sectional view taken from FIG. 1 of the modular EMRV in a first transport position within a mating cavity.
Figure 13A:
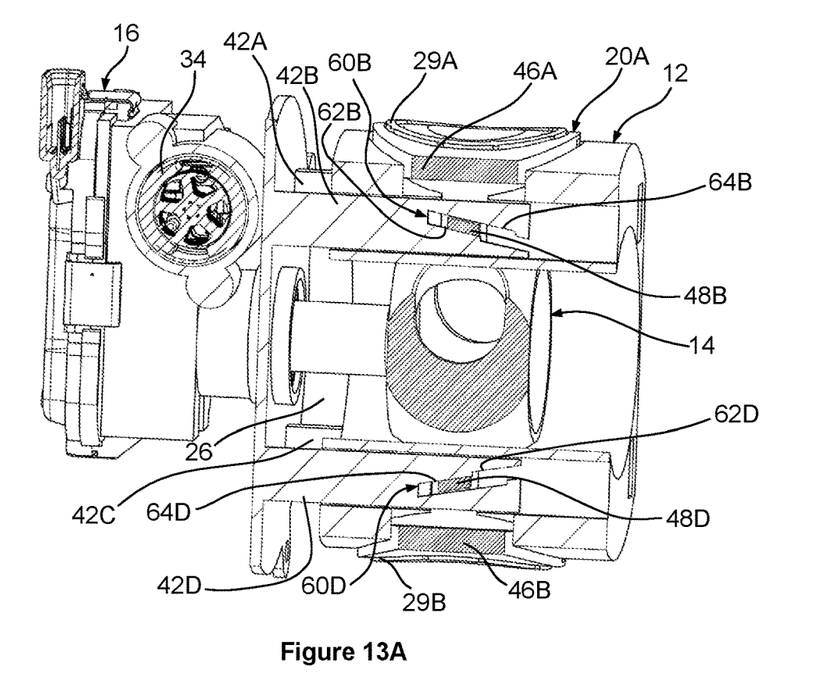
FIG. 13A is a perspective cross-sectional view taken from FIG. 1 with the modular EMRV in a second installed position.

Referring specifically to the second cam groove 60B of FIGS. 12A and 13A, two portions are present to facilitate different radial positions of the first seal interface housing 46A within the first transverse through-bore 27A. A retention portion 62B holds the second cam follower 48B in a first transport position, as shown in FIG. 12A, such that the second cam leg 42B and the second cam follower 48B are locked together. This prevents the first inlet seal interface housing 46A from falling out of the first transverse bore 27A and the second cam leg 42B from sliding out of the second reception channel 44B of the valve enclosure 12. The first transport position is ideal for transporting the modular EMRV 10 to a manufacturing facility for assembly within the mating cavity 50A of any of the previously described powertrain components such as an IC engine or transmission—or any other receiving structure. FIG. 12B shows the first transport positions of the first and second inlet seal housings 46A, 46B relative to the central axis 18 of the valve enclosure 12, denoted by a first radial distance Rt. It should be noted that in the first transport position the first and second exterior seal interfaces 28A, 28B of the respective first and second inlet seal housings 46A, 46B are not sealingly engaged with the third and fourth interior seal interfaces 58A, 58B of the mating cavity 50A.

Figure 13B:
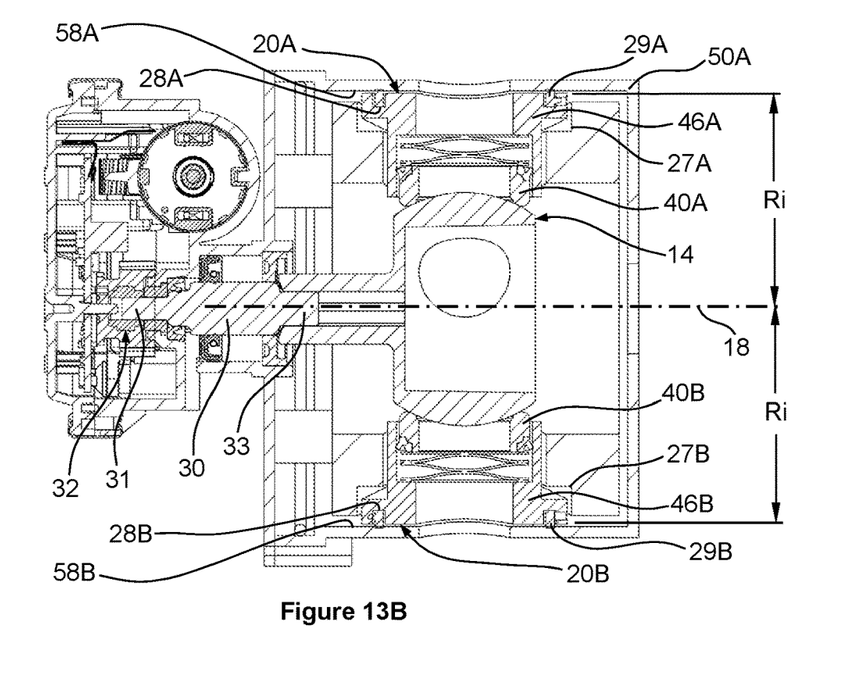
FIG. 13B is a cross-sectional view taken from FIG. 1 with the modular EMRV in a second installed position within a mating cavity.

After insertion of the modular EMRV 10 within the mating cavity 50A while in the first transport position, the cam legs 42A-42D are displaced further within the respective reception channels 44A-44D, until an abutment surface 15 of the actuator assembly 16 engages a mounting surface 55 of the mating cavity 50A. With reference to FIGS. 13A and 13B, further insertion of the second cam leg 42B within the second reception channel 44B causes a ramp portion 62B of the second cam groove 60 to urge the second cam follower 48B upward, displacing the first inlet seal housing 46A to a second installed position. FIG. 13B shows the second installed positions of the first and second inlet seal housings 46A, 46B relative to the central axis 18 of the valve enclosure 12, denoted by a second radial distance Ri. It should be noted that the second radial distance Ri of the second installed position is greater than the first radial distance Rt of the first transport position.

To complete the installation, attachment apertures 13A-13D arranged on the actuator assembly 16 are aligned with reception apertures 53A-53D arranged on the mating cavity 50A to facilitate an appropriate rotational position and attachment of the modular EMRV 10 by fasteners (not shown); other means of attachment are also possible. In this rotational position, the first inlet flow passage 54A of the mating cavity 50A is aligned with the first inlet 20A of the valve enclosure 12, the second inlet flow passage 54B of the mating cavity 50A is aligned with the second inlet 20B, and the outlet flow passage 56 of the mating cavity 50A is aligned with the outlet 22 arranged on the second end 25 of the valve enclosure 12.

FIGS. 1 through 4 capture a cam groove and cam follower system that utilizes four cam legs 42A-42D, four cam grooves 60A-60D, and four cam followers 48A-48D; however, variations to this system are possible. For example, it may be possible to utilize only one cam groove (arranged on one cam leg) and one cam follower for each inlet or outlet seal housing. Additionally, the form of the cam groove and followers may be different than what is shown in the figures.

Figure 6A:
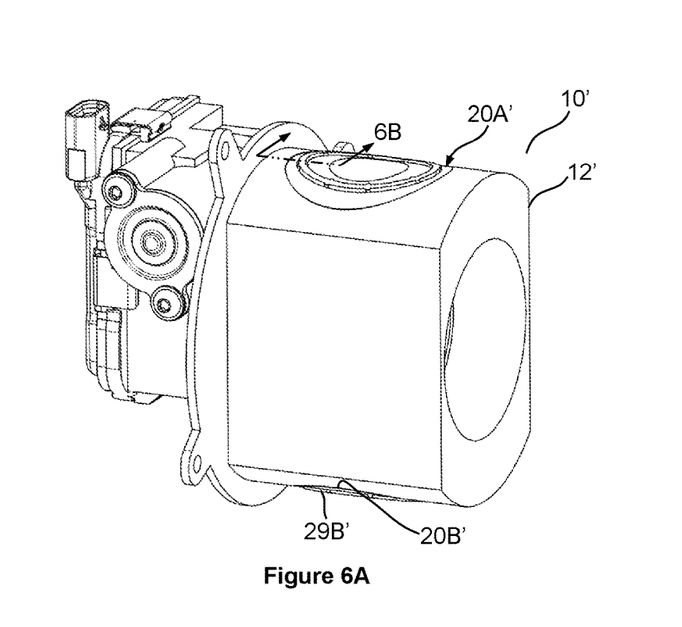
FIG. 6A is a perspective view of another example embodiment of a modular EMRV.
Figure 6B:
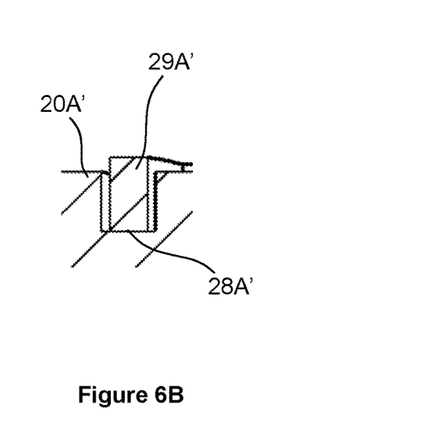
FIG. 6B is a cross-sectional view taken from FIG. 6A.

Referring to FIGS. 6A and 6B, an example embodiment of a modular EMRV 10' is shown that does not use the cam groove and cam follower system previously described for the modular EMRV 10 of FIGS. 1 through 5. First and second inlets 20A', 20B' are arranged on the valve enclosure 12' of the modular EMRV 10'. As in the previously described example embodiment, the first inlet 20A is configured with a first exterior seal interface 28A' that sealingly engages the third interior seal interface 58A of the mating cavity 50A. Likewise, the second inlet 20B' is arranged with a second exterior seal interface (not shown) that sealingly engages the fourth interior seal interface 58B of the mating cavity 50A. Optional first and second seals 29A', 29B' can be arranged between the respective exterior and interior seal interfaces.

Given the stationary position of the first and second inlets 20A', 20B', proper sealing is achieved by simply inserting the valve enclosure 12' within the mating cavity 50A until alignment between the respective seal interfaces occurs.

Figure 11A:
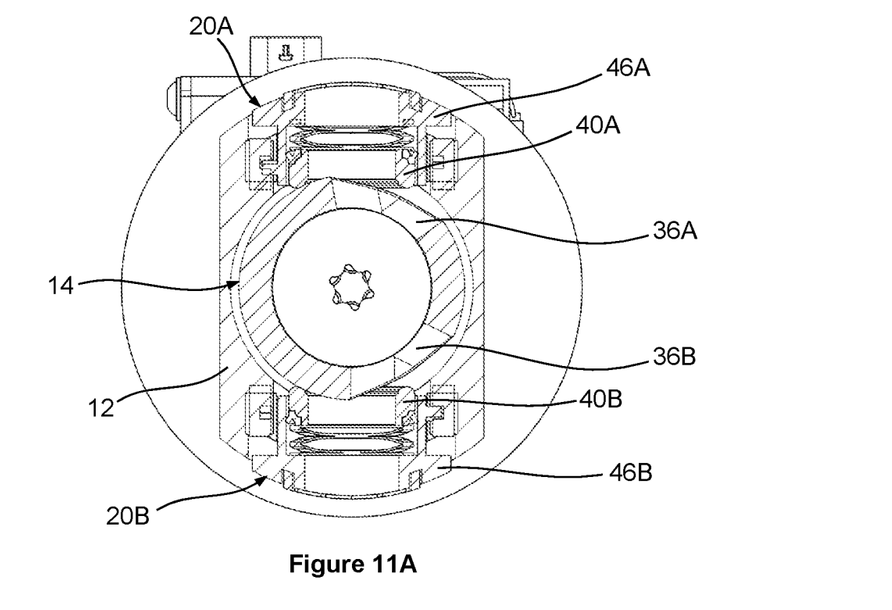
FIGS. 11A-11C are cross-sectional views taken from FIG. 1 showing three potential rotary valve body rotational positions.
Figure 11B:
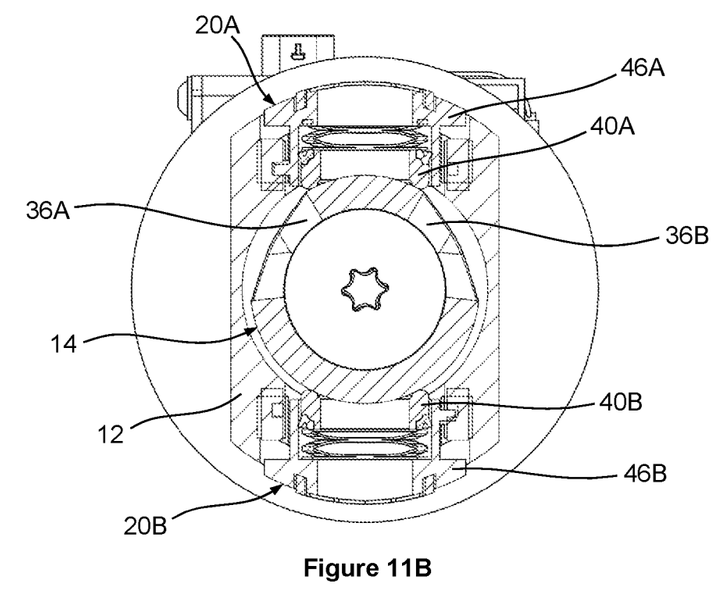
Figure 11C:
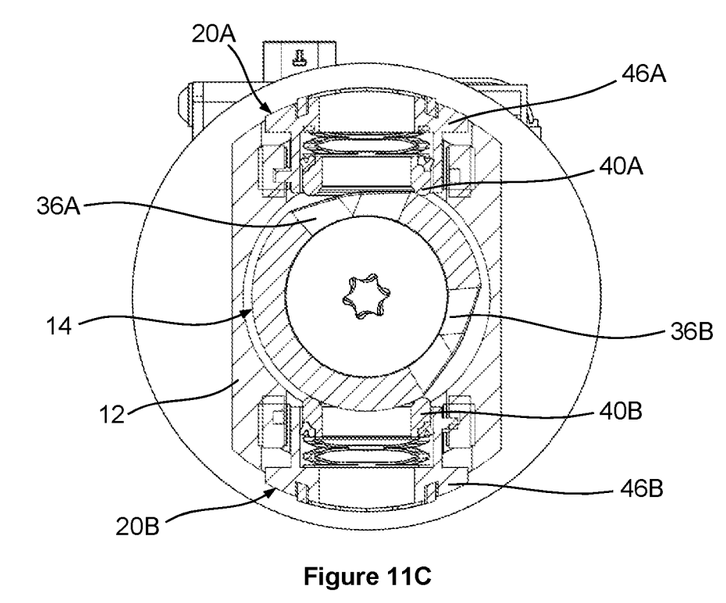

Referring to FIGS. 11A through 11C, three rotational positions of the rotary valve body 14 are shown for the previously described modular EMRVs 10, 10' that result in different fluid flows from the first and second inlets 20A, 20B to the outlet 22. FIG. 11A shows a first rotational position of the rotary valve body 14 that allows fluid flow from both the first and second inlets 20A, 20B to the outlet 22. In the first rotational position, a portion of the first fluid pathway 36A of the rotary valve body 14 is in communication with the first inlet 20A, and a portion of the second fluid pathway 36B is in communication with the second inlet 20B to facilitate flow from the first and second inlets 20A, 20B to the outlet 22. FIG. 11B shows a second rotational position of the rotary valve body 14 that prevents fluid flow from the first and second inlets 20A, 20B to the outlet 22. In the second rotational position, no portions of the first and second fluid pathways 36A, 36B of the rotary valve body 14 are in communication with either the first or second inlets 20A, 20B, therefore, no fluid flow occurs. FIG. 11C shows a first intermediate rotational position of the rotary valve body 14 that allows fluid flow from the first inlet 20A to the outlet 22, but prevents fluid flow from the second inlet 20B to the outlet 22. In the first intermediate rotational position, the first fluid pathway 36A of the rotary valve body 14 is in communication with the first inlet 20A which allows fluid flow from the first inlet 20A to the outlet 22, and no portions of the first and second fluid pathways 36A, 36B are in communication with the second inlet 20B, therefore no flow from the second inlet 20B occurs. The previously described rotational positions are only a sampling of the positions and flow states that are possible. One that is skilled in the art of EMRVs would understand that additional fluid flow combinations are possible such as an alternative first rotational position that prevents fluid flow from the first inlet 20A to the outlet 22, but allows fluid flow from the second inlet 20B to the outlet 22.

The previously described modular EMRVs 10, 10' provide a simplified, low-cost design that eliminates a traditional outer housing and the typical failure modes that often occur with plastic outer housings, such as cracking and leaking. The cumbersome packaging space typically associated with an EMRV is significantly reduced by the utilization of the mating cavity 50A that potentially eliminates all or most of the coolant hoses required for transport of engine coolant to various regions or parts of a powertrain system. The mating cavity 50A can be formed on or within a powertrain component or any other receiving structure by current state-of-the-art casting and machining methods. The unitized design of the modular EMRVs 10, 10' facilitates improved serviceability and adaptability to a diverse array of fluid systems.

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

I claim:

1. An electro-mechanical rotary valve configured to be installed and removed as a unit, comprising:
   a valve enclosure arranged to be removably disposed within a mating cavity, the mating cavity configured as a fluid terminal with at least two flow passages that extend outwardly from an interior wall of the mating cavity, the valve enclosure having:
      at least one inlet configured to be fluidly connected to any of the at least two flow passages;
      at least one outlet configured to be fluidly connected to any of the at least two flow passages;
      an actuator interface;
      a hollow center; and,
      at least one exterior seal interface arranged on at least one of the at least one inlet or the at least one outlet, the at least one exterior seal interface configured to sealingly engage at least one interior seal interface arranged on the interior wall of the mating cavity;
   at least one rotary valve body, disposed within the hollow center, the at least one rotary valve body having:
      at least one fluid pathway; and,
      an actuator interface; and,
   an actuator assembly engaged with the actuator interface, the actuator assembly having an electronically-controlled actuator configured to be provided electronic communication from an electronic controller to move the at least one rotary valve body to a selected one of any angular position within a continuous range of angular positions.

2. The electro-mechanical rotary valve of claim 1, wherein:
   the at least one inlet comprises of a plurality of inlets; and,
   the at least one exterior seal interface sealingly isolates the plurality of inlets.

3. The electro-mechanical rotary valve of claim 1, wherein the actuator assembly is arranged at a first end of the valve enclosure and the at least one outlet is arranged at a second end of the valve enclosure.

4. The electro-mechanical rotary valve of claim 3, wherein:
   the at least one rotary valve body is comprised of one rotary valve body;
   the at least one fluid pathway is comprised of a first and a second fluid pathway;
   the at least one inlet is comprised of a first inlet and a second inlet;
   the at least one outlet is comprised of one outlet;
   the at least one exterior seal interface is comprised of:
      a first exterior seal interface; and,
      a second exterior seal interface.

5. The electro-mechanical rotary valve of claim 4, wherein the rotary valve body is further comprised of a single lobe, the lobe configured with the first and second fluid pathways.

6. The electro-mechanical rotary valve of claim 4, wherein the actuator assembly is further comprised of a gear train actuated by the actuator.

7. The electro-mechanical rotary valve of claim 6, wherein the actuator assembly further comprises a drive shaft, a first end of the drive shaft engaged with the gear train and a second end of the drive shaft engaged with the actuator interface.

8. The electro-mechanical rotary valve of claim 7, including:
   a first rotational position of the rotary valve body that allows fluid flow from the first inlet and second inlet to the outlet;
   a second rotational position of the rotary valve body that prevents fluid flow from the first and second inlets to the outlet; and,
   a first intermediate rotational position of the rotary valve body that allows fluid flow from one of the first or second inlet to the outlet, and prevents fluid flow from the other of the first or second inlet to the outlet.

9. The electro-mechanical rotary valve of claim 1, further comprising:
   at least one of the at least one inlet or the at least one outlet include at least one seal interface housing configured with the at least one exterior seal interface, the at least one seal interface housing having at least one cam follower;
   at least one transverse through-bore arranged on the valve enclosure to receive the at least one seal interface housing;
   a cam leg portion extending from the actuator assembly, the cam leg portion having:
      at least one cam leg, the at least one cam leg configured with at least one cam groove to engage one of the at least one cam follower; and,
   the at least one seal interface housing actuated by the cam leg portion to move longitudinally within the at least one transverse through-bore.

10. The electro-mechanical rotary valve of claim 9, wherein the at least one cam groove is configured with a ramp portion.

11. The electro-mechanical rotary valve of claim 10, wherein the at least one cam groove is configured with a retention portion.

12. The electro-mechanical rotary valve of claim 11, wherein at least one reception channel extends longitudinally from a first end of the valve enclosure to receive the at least one cam leg.

13. The electro-mechanical rotary valve of claim 12, wherein:
   the at least one transverse through-bore is comprised of a first and a second transverse through-bore;
   the at least one exterior seal interface is comprised of a first and a second exterior seal interface;
   the at least one seal interface housing is comprised of a first and a second inlet seal interface housing, the first inlet seal interface housing configured with the first exterior seal interface and the second inlet seal interface housing configured with the second exterior seal interface;
   the at least one cam follower is comprised of:
      a first and a second cam follower arranged on the first inlet seal interface housing; and,
      a third and a fourth cam follower arranged on the second inlet seal interface housing;
   the at least one cam leg is comprised of:

a first cam leg configured with a first cam groove to engage the first cam follower;
a second cam leg configured with a second cam groove to engage the second cam follower;
a third cam leg configured with a third cam groove to engage the third cam follower; and,
a fourth cam leg configured with a fourth cam groove to engage the fourth cam follower;
the at least one reception channel is comprised of:
a first, a second, a third, and a fourth reception channel that receive the first, second, third, and fourth cam legs, respectively; and,
the first, second, third and fourth cam grooves are configured with a first, a second, a third, and a fourth retention portion, respectively; and,
the first, second, third and fourth cam grooves are configured with a first, a second, a third, and a fourth ramp portion, respectively.

14. The electro-mechanical rotary valve of claim 13, having:
a first transport position with the first and second seal interface housings at a first radial distance, the first transport position including:
the first, second, third and fourth retention portions engaged with the first, second, third and fourth cam followers, respectively; and,
a second installed position with the first and second seal interface housings at a second radial distance, the second installed position including:
the first, second, third and fourth ramp portions engaged with the first, second, third and fourth cam followers, respectively; and,
the second radial distance is greater than the first radial distance.

15. An electro-mechanical rotary valve configured to be installed and removed as a unit, comprising:
a valve enclosure removably disposed within a mating cavity, the mating cavity configured as a fluid terminal with at least two fluid flow paths that extend outwardly from an interior wall of the mating cavity, the valve enclosure having:
at least one inlet configured to be fluidly connected to any of the at least two flow passages;
at least one outlet configured to be fluidly connected to any of the at least two flow passages;
an actuator interface;
a hollow center;
at least one exterior seal interface arranged on at least one of the at least one inlet or the at least one outlet to sealingly engage at least one interior seal interface arranged on the interior wall of the mating cavity;
at least one rotary valve body, disposed within the hollow center, the at least one rotary valve body having:
at least one fluid pathway; and,
an actuator interface; and,
an actuator assembly engaged with the actuator interface, the actuator assembly having an electronically-controlled actuator configured to be provided electronic communication from an electronic controller to move the at least one rotary valve body to a selected one of any angular position within a continuous range of angular positions.

16. The electro-mechanical rotary valve of claim 15, wherein the mating cavity is configured within a powertrain component.

17. The electro-mechanical rotary valve of claim 15, wherein the mating cavity extends inwardly from an outer wall of a receiving structure.

18. The electro-mechanical rotary valve of claim 15, wherein the mating cavity protrudes outwardly from an outer wall of a receiving structure.

19. The electro-mechanical rotary valve of claim 15, wherein the mating cavity is cylindrical.

* * * * *